(12) United States Patent
Stanfeld

(10) Patent No.: US 11,588,878 B2
(45) Date of Patent: Feb. 21, 2023

(54) REMOTE SUPPORT DEVICE

(71) Applicant: BifrostConnect ApS, Copenhagen S (DK)

(72) Inventor: Benjamin Stanfeld, Copenhagen (DK)

(73) Assignee: BIFROSTCONNECT APS, Copenhagen S (DK)

( * ) Notice: Subject to any disclaimer, the term of this patent is extended or adjusted under 35 U.S.C. 154(b) by 0 days.

(21) Appl. No.: 17/052,614

(22) PCT Filed: Mar. 26, 2019

(86) PCT No.: PCT/EP2019/057558
§ 371 (c)(1),
(2) Date: Nov. 3, 2020

(87) PCT Pub. No.: WO2019/211045
PCT Pub. Date: Nov. 7, 2019

(65) Prior Publication Data
US 2021/0368000 A1    Nov. 25, 2021

(30) Foreign Application Priority Data

May 4, 2018    (DK) .......................... PA 2018 70268

(51) Int. Cl.
*H04L 67/025*    (2022.01)
*G06F 3/14*    (2006.01)
(Continued)

(52) U.S. Cl.
CPC .......... *H04L 67/025* (2013.01); *G06F 3/1454* (2013.01); *H04L 41/04* (2013.01); *H04L 63/0272* (2013.01); *H04L 63/0807* (2013.01)

(58) Field of Classification Search
CPC ... H04L 67/025; H04L 41/04; H04L 63/0272; H04L 63/0807; G06F 3/1454; G06F 21/34; G06F 21/42; G06F 21/85
See application file for complete search history.

(56) References Cited

U.S. PATENT DOCUMENTS 7,519,749 B1    4/2009   Sivertsen
8,595,321 B2    11/2013  Hoang
(Continued)

FOREIGN PATENT DOCUMENTS

WO    2004027560 A2    4/2004
WO    2013023195 A1    2/2013

OTHER PUBLICATIONS

International Search Report and Written Opinion from PCT Application No. PCT/EP2019/057558, dated May 31, 2019.
(Continued)

*Primary Examiner* — Michael Won
(74) *Attorney, Agent, or Firm* — Workman Nydegger

(57) ABSTRACT

A portable remote support device comprises a processing unit, a network communication unit configured to communicate with a cloud service, a video capturing unit, at least one video input port and at least one output port. The processing unit is configured to communicate video signals received via the video input port to the cloud service via the network communication unit, and to emulate pointing device signals and/or keyboard signals received via the network communication unit on said at least one output port. The portable remote support device is configured to obtain unique secure tokens.

3 Claims, 2 Drawing Sheets

(51) Int. Cl.
 *H04L 41/04* (2022.01)
 *H04L 9/40* (2022.01)

(56) References Cited

U.S. PATENT DOCUMENTS

| | | | |
|---|---|---|---|
| 9,118,642 B2 * | 8/2015 | Rahardja | H04L 63/108 |
| 2005/0198532 A1 * | 9/2005 | Comlekoglu | H04L 63/0272 |
| | | | 726/5 |
| 2007/0079008 A1 | 4/2007 | Leibovich et al. | |
| 2007/0113267 A1 | 5/2007 | Iwanski et al. | |
| 2007/0206630 A1 | 9/2007 | Bird | |
| 2011/0063211 A1 | 3/2011 | Hoerl et al. | |
| 2011/0214176 A1 * | 9/2011 | Burch | H04L 67/10 |
| | | | 718/1 |
| 2012/0254957 A1 * | 10/2012 | Fork | G06F 21/33 |
| | | | 726/6 |
| 2012/0266231 A1 * | 10/2012 | Spiers | H04L 9/3234 |
| | | | 726/12 |
| 2014/0244488 A1 * | 8/2014 | Kim | G06Q 20/02 |
| | | | 705/39 |
| 2014/0331309 A1 * | 11/2014 | Spiers | H04L 63/0281 |
| | | | 726/12 |
| 2015/0229509 A1 * | 8/2015 | Castine | G06F 15/16 |
| | | | 709/208 |
| 2016/0012465 A1 * | 1/2016 | Sharp | G06Q 20/386 |
| | | | 705/14.17 |
| 2016/0044035 A1 * | 2/2016 | Huang | H04L 63/08 |
| | | | 726/4 |
| 2018/0048674 A1 * | 2/2018 | Black | H04L 63/02 |
| 2018/0123804 A1 * | 5/2018 | Smith | H04L 9/0825 |
| 2019/0089748 A1 * | 3/2019 | Manor | H04L 63/205 |
| 2019/0251297 A1 * | 8/2019 | Khan | G06F 8/65 |
| 2019/0372960 A1 * | 12/2019 | Huang | H04L 9/3213 |
| 2020/0287915 A1 * | 9/2020 | Neuvirth | H04L 63/0853 |
| 2020/0293477 A1 * | 9/2020 | Lefebvre | G06F 21/606 |
| 2020/0311241 A1 * | 10/2020 | Lefebvre | G06F 13/4282 |
| 2021/0042830 A1 * | 2/2021 | Burke | G06F 16/2379 |

OTHER PUBLICATIONS

Search Report from corresponding DK Application No. PA201870268, dated Jul. 23, 2018.
International Preliminary Report on Patentability from PCT Application No. PCT/EP2019/057558, dated May 7, 2020.

* cited by examiner

REMOTE SUPPORT DEVICE

FIELD OF THE INVENTION

The present invention relates to a portable remote support device and a method for remote supporting computer equipment.

BACKGROUND OF THE INVENTION

Most computer equipment, such as Personal Computers (PCs), servers, routers, switches, IoT devices, robots, household appliances, etc., will at some point during its lifetime require support for, e.g., setup, connection and hardware failures, malfunction, software updates, restarts after a power loss, or the like.

Computer equipment, such as servers and/or PCs, often contains information which is critical to operations, and the physical and virtual access to them is therefore often restricted. Virtual access is often restricted by layers of antivirus/anti-spyware/anti-malware software, secure network setups, and security policies preventing virtual and/or physical access to the computer equipment by prohibiting unknown hardware, such as USB-devices, to be connected to the servers. Furthermore, network problems may occur with respect to a communication network which the equipment is connected to. Similarly, physical access is typically restricted e.g. by the server room being securely locked with only a few IT-competent, trusted employees being granted access. These trusted employees have a basic understanding of computer equipment, but may not have the necessary skillset to handle more complex situations.

Thus, a specialised technician is typically required to set up and support the computer equipment. In order to do so, the specialised technician will typically need access to an input device, such as a mouse and/or a keyboard, as well as a display showing e.g. the screen output of a PC/server. The specialised technician might additionally or instead need a supporting device, such as a smartphone, a tablet computer, or a PC, to communicate with and/or sending commands to the computer equipment over e.g. a serial connection. Hence, the input devices, display and/or the supporting device will need to be connected to the computer equipment.

A need for higher efficiency and reduced downtime has made "remote access" solutions increasingly popular in recent years. However, existing solutions have some critical limitations as they need 1) Internet connection or 2) "fully working computer". Downtime is often caused by these two factors, resulting in a need of a physical presence by a specialised technician.

The support of computer equipment, therefore, typically requires a specialised technician to be physically present whilst supporting the computer equipment. Thus, a specialised technician may either be located on-site or travel to the equipment every time support is needed.

Many companies have centralised specialised technicians, and having them travel to various locations will be very expensive and the response time will be too long. Reducing downtime is critical as a company may be completely or partially prohibited from operations, thus leading to high costs for the companies including losses in goodwill and reputation.

U.S. Pat. No. 8,595,321 discloses a remote control support system providing a simple way to allow remote users to access a computer in a variety of circumstances, even when no software is installed on the computer. In some cases, the system includes a hardware device to simulate most USB mice, keyboards, storage devices, camera sensors (to capture a screen display), etc. The hardware device can communicate with a remote computer (via a network connection) to allow a user, such as a remote technician, to work on the remote computer as if the user was sitting at the remote computer. Information technology professionals and other users can use the described systems to communicate with a user at a remote computer in a natural way to communicate via voice, video or chat with online messaging.

Thereby, a technician may be located remotely and through a network connection connect a supporting device, i.e. a remote computer, to a remote support device, which is powered and connected to a piece of computer equipment to be supported. Through this network connection, the technician can send, e.g., mouse commands, keystrokes or other communication to the piece of computer equipment to be supported.

This, however, requires the remote support device to be set up in place and powered, before the technician can connect to the remote support device. Thus, the remote support device must be installed permanently, which allows a remote support device to support only one piece of computer equipment. Consequently, this may require a large initial installation time of the remote support device as well as high costs by having one remote support device per computer equipment.

Alternatively, the remote support device may be moved and connected to another piece of computer equipment by a trusted person by disconnecting, moving and reconnecting the remote support device to the other piece of computer equipment. The technician will then have to reconnect to the remote support device upon every movement of the computer equipment. Moreover, in an environment, e.g. a server room, with power outages, the technician will lose the connection to the remote support device and needs to reconnect with every power loss. Furthermore, the technician may have to remain in contact with the trusted person during the movement of the remote support device, e.g. over the phone, to provide information regarding whether the device has been connected correctly or not.

WO 2013/023195 discloses a network device and a method for remote computer operation. The network device comprises a processor, an interface for emulating a human interface device, a video input, and a data storage for storing data from a target device or transferring data to the target device. The network device further comprises a first network interface, and is configured to provide control of a target device, through the interface for emulating a human interface device.

DESCRIPTION OF THE INVENTION

It is an object of embodiments of the invention to provide a remote support method and a device for remote support of computer equipment, which is more time-efficient and has a higher connection stability in use.

It is a further object of embodiments of the invention to provide a remote support method and a device for remote support of computer equipment, in which the risk of third parties gaining unauthorised access to the computer equipment through the remote support system is minimised.

It is an even further object of embodiments of the invention to provide a remote support method and a device for remote support of computer equipment which is easy to use without compromising security.

It is an even further object of embodiments of the invention to provide a remote support method and device for remote support of computer equipment, in which remote access is available, even if the network is down.

According to a first aspect the invention provides a portable remote support device comprising a processing unit, a network communication unit configured to communicate with a cloud service, a video capturing unit, at least one video input port and at least one output port, said processing unit being configured to communicate video signals received via the video input port to the cloud service via the network communication unit, and said processing unit being configured to emulate pointing device signals and/or keyboard signals received via the network communication unit on said at least one output port, and wherein the portable remote support device is configured to obtain unique secure tokens.

Here, the pointing device signal may be a mouse signal, a trackball signal, a touchpad signal, a trackpoint signal, a joystick signal, a touch screen input signal, or any combination thereof. Additionally, the keyboard signal may be a signal from a QWERTY-keyboard or national variants thereof, a T9-style keyboard, a numeric keypad, a MIDI-keyboard, an emulator of any of these, or any combination thereof. The portable remote support device may, e.g., comprise a first and a second output port, in which case pointing device signals may be emulated on the first output port and keyboard signals may be emulated on the second output port.

The at least one output port may furthermore be a serial port using a serial communication, such as Recommended Standard 232 (RS-232), Universal Asynchronous Receiver-Transmitter (UART), Universal Synchronous and Asynchronous Receiver-Transmitter (USART), or preferably the Personal System/2-specification (PS/2), or any combination thereof. As e.g. server environments are typically subject to strong security policies, connecting external devices via e.g. a USB-connection, through which software may be transmitted, is not preferred, and may be considered a breach of security. The at least one output port may, thus, use a standard protocol only allowing an e.g. mouse and/or keyboard input, such as the PS/2 and IBM Standard Protocol. Thereby, the remote support device provides an additional security, as malicious software, such as a computer virus, malware, or spyware, may not be able to be transmitted through the at least one output port, in case unauthorised access to, such as hacking of, the portable support device occurs.

The remote support may be unattended by a trusted person, as the technician can control the computer equipment through the connected portable remote support device. Additionally, the trusted person may not need IT-competence to connect and set up the remote support device and may thus be a lay person and/or any employee of a company.

In the present context the term 'portable remote support device' should be interpreted to mean a hardware device which can easily be moved from one position to another, and which is capable of establishing support access to a piece of computer equipment from a remote location, such as a remote support centre.

In the present context the term 'computer equipment' should be interpreted to mean any kind of equipment which includes a processor, and which may be in need of remote support. Thus, the computer equipment may be in the form of personal computers (PCs), servers, routers, switches, IoT devices, robots, household appliances, sensors, etc.

The portable remote support device comprises a network communication unit configured to communicate with a cloud service. In the present context the term 'cloud service' should be interpreted to mean a service which is accessible via a network connection, such as an Internet connection, and which provides services, e.g. in the form of data storage, support, etc., on demand without direct management by the user. Thus, the network communication unit is capable of establishing a network connection between the portable remote support device and such a cloud service.

The portable remote support device further comprises a video capturing unit and at least one video input port, and the processing unit is configured to communicate video signals received via the video input port to the cloud service via the network communication unit. Thus, a video signal can be supplied from the location of the computer equipment requiring remote support to the cloud service by the portable remote support device, via the video input port and the network communication unit. The video signals may, e.g., be in the form of a video signal from a camera directed towards the computer equipment and/or in the form of a video output from the computer equipment, such as a signal which would normally be supplied to a monitor of the computer equipment. In the latter case a video signal reflecting what is normally displayed to an operator at the computer equipment via a monitor is provided to the cloud service, thereby allowing support personnel accessing the cloud service to view exactly what a locally positioned operator would view.

Furthermore, the processing unit is configured to emulate pointing device signals and/or keyboard signals, as defined above, received via the network communication unit on the at least one output port. Thereby remotely located support personnel is able to provide suitable pointing device signals and/or keyboard signals to the computer equipment requiring remote support, via the cloud service and the portable remote support device. Accordingly, the remotely located support personnel can control the computer equipment in the same manner as a locally located operator.

The portable remote support device is configured to obtain unique secure tokens. In the present context the term 'unique secure token' should be interpreted to mean unique code associated with and identifying the remote portable support device, and which needs to be applied in order to gain access to the portable remote support device. The unique secure token could, e.g., be in the form of a number with a predetermined number of digits. The unique secure token may be generated once, e.g. upon initiating use of the portable remote support device. However, the unique secure token will normally be refreshed from time to time, e.g. at predefined time intervals or in response to certain events, such as each time the portable remote support device is powered on or each time a remote support session is initiated. This will be described in further detail below. Furthermore, the unique secure token may be obtained by the portable remote support device generating the unique secure token itself, or by the unique secure token being provided to the portable remote support device from an external source, e.g. via the cloud service. This will also be described in further detail below.

Since the portable remote support device is configured to obtain unique secure tokens, it can be ensured that the communication taking place between the portable remote support device and the cloud service takes place in a secure manner, and the risk of unauthorised access to the computer equipment requiring remote support, via the portable remote support device is minimised. Furthermore, the secure communication with the remote support personnel is established in an easy manner.

Thus, the connection between at least the portable remote support device and the cloud service, and preferably also connection between the cloud service and device operated by a technician, may be a secure connection, e.g. via HTTPS.

The portable remote support device preferably also comprises a hardware or software script blocker preventing automated scripts from causing a series of pointing device signals and/or keyboard signals on the at least one output port. The script blocker may be implemented in the processing unit and/or the network communication unit. This may increase the security of the remote support device, as any pointing device signal, such as a cursor movement, and/or any keyboard signal, such as entering a character, on the computer equipment will be visible on the display and, thus, also visible to the technician and/or the trusted person. The technician and/or the trusted person may abort the support session and/or disconnect the device if e.g. undesired characters and/or cursor movements occur on the computer equipment. Hence, a potential hacker may be prevented from causing unwanted actions on the piece of computer equipment to be supported.

Alternately or additionally the cloud service could be enabled to detect programming code entered via keyboard or mouse and possibly terminate connections, record such codes or alert other operators.

For additional protection, a password can be assigned to the remote support device. In this case a malicious party would need to know the secure token ID as well as the password in order to access the remote support device.

The remote support device may furthermore be used to support computer equipment outside restricted areas, e.g. in offices, home offices, or the like.

The portable remote support device may further comprise a secure token generating unit. According to this embodiment, at least some of the unique secure tokens are generated by the portable remote support device. Once a given unique secure token has been generated, the unique secure token may be shared with the cloud service, e.g. by the portable remote support device communicating the unique secure token directly to the cloud service.

Alternatively or additionally, the portable remote support device may be configured to receive secure tokens from a cloud service via the network communication unit. According to this embodiment, at least some of the unique secure tokens are not generated by the portable remote support device, but are instead provided to the portable remote support device from an external source via the cloud service. For instance, the unique secure tokens may be generated by the cloud service and subsequently shared with the portable remote support device. As an alternative, the cloud service may receive the unique secure tokens from another source and forward them to the portable remote support device.

In an embodiment, the portable remote support device comprises a display adapted to display a status of the portable remote support device. The status displayed at the display may, e.g., comprise network connection information. In the case that the portable remote support device comprises a battery, the displayed status information may comprise battery charge information, such as state of charge (SoC).

Consequently, the trusted person or technician who e.g. sets up the remote support device may be provided with information about the system. By the status comprising network information, the trusted person, who e.g. sets this up, is able to see whether the device is connected to a network and thus connectable by a technician. As coverage of wireless connections, such as 2.4 GHz and 5 GHz wireless networks, 3G/4G/LTE, satellite networks, or the like, within a room may vary, a status showing network information may allow the trusted person to place the remote support device, where good wireless coverage is provided. Hence, latency and a percentage of lost packages may be minimised, thereby allowing for a seamless data transfer. By the display, alternatively or in combination with the network information status, being adapted to display battery charge information, such as SoC, the trusted person may estimate the remaining running time on battery and/or plan charging of the device. Furthermore, the display may show battery health, such as State of Health (SoH), which allows the trusted person to plan battery replacements with time.

The display may further be adapted to display one or more of: number of connected remote computers, mouse pointing device connection information, video connection information, and/or keyboard connection information.

Thereby, setting up, connecting, disconnecting, and/or checking a status of the remote support device may be intuitive for the trusted person, who may thus be a lay person. Similarly, the setup, connecting/disconnecting and/or checking a status may require less time for the trusted person than if he/she would have to get feedback, e.g. over the phone, from a technician who is connected to the device. Additionally, the remote support device may be set up, connected, and/or disconnected regardless of whether a technician is available at that time to connect to the remote support device.

The display may further be adapted to display unique secure tokens. According to this embodiment, the currently valid unique secure token is displayed on the display, thereby allowing the trusted person to view the token. When requesting assistance, e.g. by calling, or otherwise contacting, a technician, the trusted person can communicate the token to the technician, thereby allowing the technician to access the portable remote support device via the cloud service. This is in particular an advantage in the case that a new unique secure token is generated relatively often.

As an alternative, the unique secure token may not be displayed on the display. For instance, it may be possible to configure the display in such a manner that the token is not displayed. This could, e.g., be relevant in the case that a unique secure token is only generated once, or at very long time intervals, in which case displaying the unique secure token might lead to a security breach.

The portable remote support device may further comprising a battery adapted for powering the remote support device in use for a predetermined duration.

By the portable remote support device comprising a battery adapted for powering the remote support device in use for a predetermined duration, the remote support device may remain powered when the remote support device is not connected to an external power supply. Thereby, the remote computer of a technician may remain connected to the remote support device, whilst the device is being connected to or disconnected from a piece of computer equipment. It may, hence, be moved from one piece of computer equipment to another, whilst remaining powered, thus saving time, as several pieces of computer equipment may be supported consecutively, when the trusted person is near the computer equipment, e.g. in the server room or another access-restricted area. By the remote computer remaining connected to the remote support device, the necessary time for remote supporting several pieces of computer equipment is reduced, as reestablishment of connection between the remote computer and the remote support device may be avoided.

The predetermined duration may be sufficiently long to allow for a trusted person to disconnect the remote support device from a first piece of computer equipment, move the remote support device, and reconnect it to a second piece of computer equipment. The predetermined duration may thus be e.g. 10 minutes or less. The predetermined duration, however, may also allow for the remote support to be powered by the battery throughout the duration of the remote support, e.g. from 10 minutes up to several hours or more. Alternatively, the predetermined duration may allow for a remote computer to monitor the computer equipment, whilst the remote support device is powered from the battery and may thus be e.g. from 24 hours to 72 hours or more.

Often, computer equipment is connected to an uninterruptible power supply (UPS) to ensure a stable operation for a period of time when a power outage occurs. Connecting additional equipment, such as a portable remote support device, to the UPS may, however, compromise the operational stability of the computer equipment and is therefore not preferred. By the portable remote support device comprising the battery, computer equipment may be remote supported when power supply to the computer equipment is unstable and/or power outages occur.

In yet another embodiment, the remote support device may be adapted to connect to a virtual private network (VPN).

By providing a VPN-connection between the support device of the technician and the remote support device, the data is encrypted and thus more difficult for third parties to gain unauthorised access to. It will be clear to the person skilled in the art how a VPN-connection is established and used, as virtual private networks (VPNs) are very well known. VPN-connections and VPNs will therefore not be described in further detail.

In another embodiment, the network communication unit may be adapted to provide a network connection via satellite and/or via a mobile network.

According to this embodiment, the remote support device may be used to support computer equipment on locations where e.g. a local area network (LAN) through cable or Wi-Fi or 3G/4G is not available or cannot provide the necessary data bandwidth to transmit data from the remote support device to a remote computer of a technician with sufficiently low latency. Furthermore, computer equipment, such as routers and switches, that should provide a network connection in a computer environment, may be booted by or supported from boot by the remote support device. For instance, the portable remote support device may be equipped with a mobile data modem, such as a 3G, 4G or 5G data modem.

Alternatively or additionally, the network communication unit may be adapted to communicate with the cloud service via the Internet.

The portable remote support device may further comprise a serial port for connecting to equipment via a serial console. According to this embodiment, the portable remote support device may be connected to network equipment, such as routers, firewalls, relays, production machines, robots, etc. The technician will then be able to input text based commands to the network equipment via the serial port, e.g. in the form of applying or selecting appropriate settings, rebooting the equipment, running diagnostics, etc. Since only text based commands, and no data files, are communicated to the serial port in this manner, the risk of introducing malware or the like is minimised, or even eliminated.

According to a second aspect the invention provides a method for remote supporting computer equipment, the method comprising the steps of:
    providing a portable remote support device according to the first aspect of the invention,
    connecting the at least one output port of the remote support device to a pointing device input port and/or a keyboard input port of the computer equipment,
    connecting a video output port of the computer equipment to the video input port of the remote support device,
    connecting, by the network communication unit, the remote support device to a cloud service,
    obtaining a unique secure token,
    sharing the unique secure token among the remote support device and the cloud service,
    establishing a secure connection between a remote computer and the remote support device, via the cloud service, using the unique secure token,
    capturing by the video capturing unit of the remote support device a video output of the computer equipment and transmitting said captured video output to the remote computer via the established secure connection, and
    emulating on the at least one output port of the remote support device pointing device movements and/or keyboard key strokes, in response to input to the remote computer.

Thus, according to the second aspect, the invention provides a method for remote supporting computer equipment. As described above with reference to the first aspect of the invention, the term 'computer equipment' should, in the present context, be interpreted broadly to cover, not only traditional computers, but also server, routers, robots, production equipment, etc.

In the method according to the second aspect of the invention, a portable remote support device according to the first aspect of the invention is initially provided. The remarks set forth above with reference to the first aspect of the invention are therefore equally applicable here.

Next, the at least one output port of the portable remote support device is connected to a pointing device input port and/or a keyboard input port of the computer equipment. Thereby pointing device signals and/or keyboard signals can be provided to the computer equipment by the portable remote support device, thereby allowing pointing device movements and/or keystrokes performed by a remotely positioned technician to be emulated and received at the computer equipment, as if the technician was present locally and operating the computer equipment directly in a normal manner.

Furthermore, a video output port of the computer equipment is connected to the video input port of the remote support device. Thereby a video feed can be provided to the remotely located technician, via the remote support device and the cloud service, as described above with reference to the first aspect of the invention.

Next, the remote support device is connected to a cloud service by the network communication unit of the remote support device. Accordingly, a connection is established between the remote support device and the cloud, allowing communication there between.

Next, a unique secure token is obtained, and the unique secure token is shared among the remote support device and the cloud service. For instance, the unique secure token may be generated by the remote support device and subsequently communicated from the remote support device to the cloud service, via the established connection. As an alternative, the unique secure token may be generated by the cloud service and subsequently communicated to the remote support device, via the established connection. As another alternative, the unique secure token may be generated by an external source which subsequently provides the unique secure token to the remote support device as well as to the cloud service, or to one of the remote support device and the cloud service. In the latter case, the entity which receives the unique secure token directly from the external entity subsequently communicates it to the other entity.

Thus, at this point in the process, the remote support device and the cloud service are both in the possession of the unique secure token.

Next, a secure connection is established between a remote computer and the remote support device, via the cloud service and using the unique secure token. In the present context the term 'remote computer' should be interpreted to mean a computer which is arranged at a location which is remote relative to the location of the computer equipment which requires remote support. Establishing the secure connection could, e.g., include communicating the unique secure token to a remotely located technician via an alternative communication channel, e.g. by telephone, text message, via an app installed on a device, such as a cell phone, a tablet or a PC, or in any other suitable manner. The remotely located technician may then access the cloud service and enter the unique secure token, thereby gaining access to the remote support device, via the cloud service and the connection established between the remote support device and the cloud service. In order to provide an additional layer of security, access to the remote support device may further require that the technician enters a password or similar.

Once the secure connection between the remote computer and the remote support device has been established, it is possible for a technician located at the remote computer to access the portable remote support device, and thereby the computer equipment requiring remote support, via the remote computer and the secure connection.

Thus, a video output of the computer equipment is captured by the video capturing unit of the remote support device and transmitted to the remote computer via the established secure connection. Thereby the technician is able to view the video output of the computer equipment.

Furthermore, pointing device movements and/or keyboard key strokes are emulated on the at least one output port of the remote support device, in response to input to the remote computer. Accordingly, the technician can control the computer equipment requiring remote support by providing appropriate input to the remote computer and by means of the secure connection.

Consequently, a technician is able to see a video output of the computer equipment and control it by his/her remote computer through the remote support device. By emulating pointing device movements and keyboard key strokes on the at least one output port, no software or driver transfer to the computer equipment is necessary. Thus, the technician may support the device from boot and may e.g. enter and control a Basic Input/Output System (BIOS) and/or a Unified Extensible Firmware Interface (UEFI) of a piece of computer equipment. The pointing device movements may be emulated in response to e.g. a movement of a cursor, by e.g. a mouse, a touchscreen input, a visual tracking of a movement, or the like on a remote computer. The at least one output port may be configured as described in relation to the remote support device according to the invention.

The step of obtaining a unique secure token may be performed by the remote supporting device generating the unique secure token, and the step of sharing the unique secure token may comprise the remote supporting device communicating the generated unique secure token to the cloud service, via the network communication unit.

Alternatively, the step of obtaining a unique secure token may be performed by the cloud service generating the unique secure token, and the step of sharing the unique secure token may comprise the cloud service communicating the generated unique secure token to the remote supporting device, via the network communication unit.

In this case, the step of obtaining a unique secure token may further comprise the remote supporting device requesting a unique secure token. According to this embodiment, the unique secure token is generated in response to a request from the remote supporting device, e.g. in connection with initiating a remote support session.

The remote supporting device may further comprise a display, and the method may further comprise the step of displaying the unique secure token on the display. According to this embodiment, a trusted person located at the computer equipment requiring remote support is able to view the unique secure token at the display. Thereby the trusted person is able to communicate the unique secure token to a technician, e.g. via phone, text message or in any other suitable manner.

A unique secure token may be generated for each support session performed using the portable remote support device, e.g. each time the remote support device is powered on. As an alternative, a unique secure token may be generated at predefined time intervals, such as every 20 seconds, every 15 minutes, every hour, once a day, or any other suitable time interval. As another alternative, the unique secure token may be generated only once, e.g. during manufacture of the remote support device or the first time the remote support device is powered on. As another alternative, a unique secure token may be generated each time this is requested by a user or by the remote support device.

In an embodiment of the method, a battery of said portable remote support device in use acts as a power source of said remote support device, said battery being adapted to power the remote support device in use for a predetermined duration.

By a battery of the portable remote support device acting as a power source, the device may be used for supporting computer equipment in environments, where a power supply and/or the power net is unstable, as described with respect to the portable remote support device. Additionally, the portable remote support device may be moved between various pieces of computer equipment whilst remaining powered and connected to the remote computer of the technician.

In another embodiment of the method, the method comprises the step of: moving the portable remote support device, powered by said battery, between different computers, wherein the remote support device remains connected to the remote computer via the computer network during the move.

By moving the portable remote support device between different computers, whilst the remote support device remains connected to the remote computer, less time is required to support multiple pieces of electronic equipment, as no time is necessary to reconnect to the remote computer via the computer network. Additionally, the technician and the trusted person need not necessarily to remain in contact over e.g. a telephone, VoIP, instant messages, text messages, e-mail, or the like, as the technician may monitor, when the device is connected to the other computer, thus saving time.

In yet another embodiment of the method, the portable remote support device comprises a display, which displays a status of said remote support device, said status comprising network connection information and/or battery charge information, preferably state of charge (SoC).

Consequently, the operating time on the battery supply may be estimated and charging may be planned and the device may be located such that latency and packet loss is minimised, as described in relation to the portable remote support system. By the network information being shown, it may be verified that the remote support device is online and/or connected to a remote computer of a technician, as described with respect to the portable remote support device.

In another embodiment of the method, the display of the portable remote support device further displays one or more of: a number of connected remote computers, pointing device connection information, video connection information, and/or keyboard connection information.

By providing connection information, the trusted person may be provided with some feedback in terms of, whether the equipment is connected correctly. Hence, the connection of the remote support device may be more intuitive and require less time and/or skill from the trusted person. Additionally, a guide on how to connect the remote support device may be displayed on the display, thus making the setup of the remote support device further intuitive.

The method according to the second aspect of the invention may, e.g., be performed in the following manner. When support to a certain piece of computer equipment is required, a unique secure token is obtained. The unique secure token may be generated at certain time intervals, in which case it is merely required that it is established what the currently valid unique secure token is. Alternatively, the unique secure token may be generated upon request and as a part of the initiation of the support session. The unique secure token may be generated by the portable remote support device, or it may be generated by an external source, e.g. a cloud service, and subsequently provided to the portable remote support device. The unique secure token may be displayed on a display of the portable remote support device. Alternatively, the unique secure token may be communicated to the trusted person in another manner, e.g. via an app installed on a cell phone, tablet, PC or the like connected to or associated with the portable remote support device.

The portable remote support device is connected to the computer equipment requiring support by connecting at least one output port of the remote support device to a pointing device input port and/or a keyboard input port of the computer equipment, and by connecting a video output port of the computer equipment to a video input port of the remote support device.

The remote support device is connected to a cloud service, and the unique secure token is shared between the remote support device and the cloud service.

The trusted person then contacts a technician which is not located at the site of the computer equipment requiring support, and communicates the unique secure token to the technician, e.g. via telephone, text message, e-mail or in any other suitable manner.

The technician then accesses the cloud service, e.g. via a browser or via an app installed on a PC, a tablet, a cell phone or any other suitable device, enters the unique secure token, and thereby establishes a secure connection between a device operated by the technician and the portable remote support device. Accordingly, the technician gains access to the portable remote support device, via the cloud service and the secure connection. Since the portable remote support device is physically connected to the computer equipment requiring support, the technician also has access to the computer equipment. The portable remote support device may be password protected, in which case the technician will further have to enter a password in order to gain access to the portable remote support device.

The cloud service now acts as an intermediary server passing video streams from the portable remote support device to the device operated by the technician, thereby displaying the video on the device of the technician. Furthermore, input actions, such as mouse movements, mouse clicks, keyboard strokes, touch input, etc., performed by the technician are transmitted to the cloud service, which in turn sends such input to computer equipment, via the portable remote support device, thereby allowing the technician to control the computer equipment.

The different aspects of the present invention can be implemented in different ways including as a remote support device and a method for remote supporting a device as described above and in the following, each yielding one or more benefits and advantages described in connection with at least one of the aspects described above, and each having one or more preferred embodiments corresponding to the preferred embodiments corresponding to the preferred embodiments described in connection with at least one of the aspects described above.

Furthermore, it will be appreciated that embodiments described in connection with one of the aspects described herein may equally be applied to the other aspects.

BRIEF DESCRIPTION OF THE DRAWINGS

The invention will now be described in greater detail based on non-limiting exemplary embodiments and with reference to the drawings, of which.

DETAILED DESCRIPTION OF THE DRAWINGS

Figure 1:
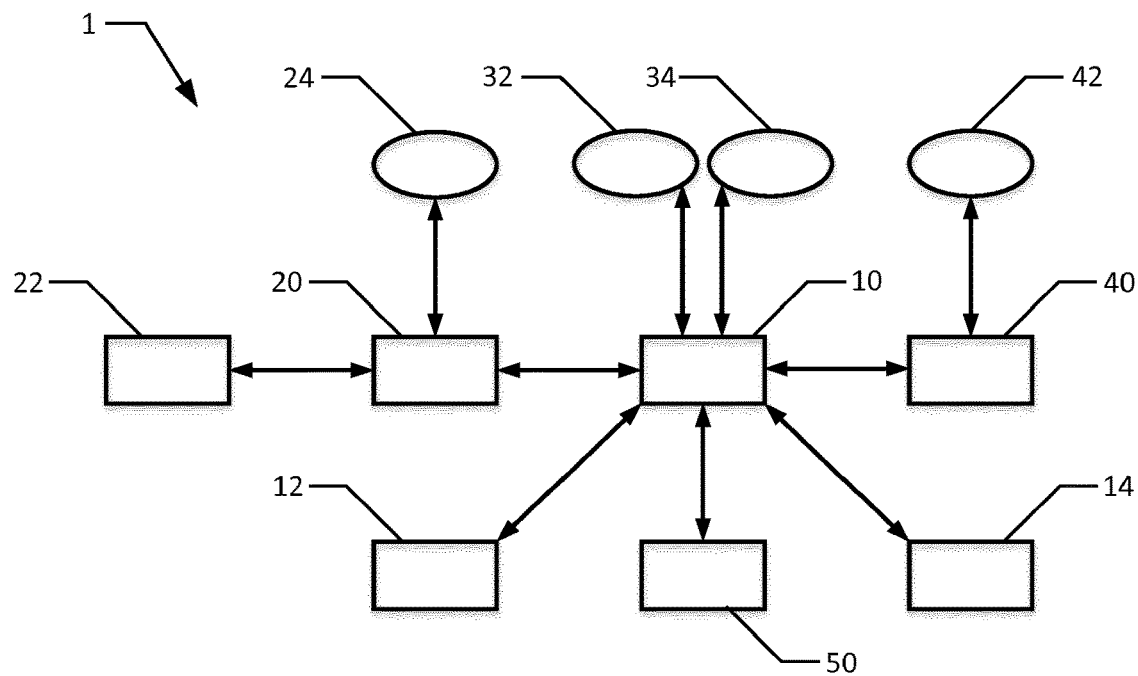
FIG. 1 shows a block diagram of an embodiment of a portable remote support device according to the invention.

In FIG. 1, a block diagram of an embodiment of a portable remote support device 1 according to the invention is shown. The portable remote support device 1 comprises a control unit 10, a display unit 12, a user input device 14, a power management unit (PMU) 20, a battery 22, and a direct current (DC) power inlet 24. The portable support device 1 further comprises a first output port 32, a second output port 34, a video capturing unit 40, a video input port 42 and a network communication unit 50.

The PMU 20 is connected to the battery 22, the power inlet 24 and the control unit 10 and monitors parameters of the battery, such as voltage and temperature, to provide a state of charge (SoC) estimate of the battery 22 to the control unit 10. The battery 22 may comprise one or more lithium-ion (LIB) cells, lithium-ion polymer (LiPo) cells, lithium-air (Li-air) cells, nickel metal hybrid (NiMH) cells, or nickel cadmium (NiCd) cells, or any combination thereof. The PMU 20 initiates charging of the battery 22 when an external power source (not shown) is connected to the power inlet 24 and stops charging, when the battery 22 has reached a sufficient SoC, such as 95%. The PMU 20 may further monitor the battery performance, e.g. maximum voltage and/or discharge curves, to estimate a state of health (SoH) or battery life time of the battery 22. In another embodiment, the PMU 20 may be integrated with the control unit 10 and/or the battery 22.

The control unit 10 is furthermore connected to the display unit 12 and the user input device 14. In another embodiment, the control unit 10 is connected to the display unit 12 through a video graphics card. The user input device 14 allows a user to e.g. power on and set up the remote support device 1 and may be a joystick, a multidirectional controller, a button, a keyboard, keypad, or any combination thereof.

Additionally, the control unit 10 is connected to a first 32 and second output ports 34, on which a pointing device signal and a keyboard signal is emulated. The first 32 and second output port 34 may be connected to a piece of computer equipment, such that e.g. the cursor and keyboard input of the computer equipment may be controlled by the remote support device 1. The control unit 10 emulates the pointing device signal, e.g. a mouse signal, and the keyboard signal on the first 32 and second output ports 34, respectively, in response to an input from a remote computer (not shown) of a technician, to which the remote support unit 1 may be connected. In another embodiment, the signals on the first 32 and second output port 34 may be emulated based on an automated process stored in the remote support device 1 or transmitted to this by the remote computer. The first 32 and second output ports 34 may be unidirectional, allowing only communication from the remote support device 1 to the computer equipment or may be bidirectional, further allowing the computer equipment to communicate with the remote support device 1.

The video capturing unit 40 is connected to the video input port 42 as well as the control unit 10. The display output of a piece of computer equipment may be connected to the video input port 42. The video signal from the computer equipment is then processed by the video capturing unit 40 and transmitted to the connected remote computer of a technician through the control unit 10 and the network communication unit 50. As the display output video signal may be an analogue or a digital signal, the video capturing unit 40 may sample, downsample, upsample, and/or discretise the display output video signal from the computer equipment. The video capturing unit 40 and/or the control unit 10 may further compress and/or encrypt the video signal to reduce the necessary data bandwidth and/or security precautions of the communication connection to the remote computer of the technician. The video capturing unit 40 may be a video graphics card, a graphics processing unit (GPU), or a graphics capture card, or any combination thereof. In another embodiment, the video capturing unit 40 is integrated with the control unit 10.

The network communication unit 50 is connected to the control unit 10 and provides a network connection interface allowing the remote support device 1 to connect to a computer network. The network connection may be a wired connection, in which case a network connection port, e.g. an 8 position 8 contact (8P8C) connector for use with a Registered Jack 45 (RJ45) network communication or a 6 Position 2 Contact 6P2C for use with a Registered Jack 11 (RJ11) network communication, may be connected to the network communication unit 50. The network communication unit 50 may be an Ethernet network unit or a dial-up modem to provide a wired network connection. Alternatively, the network communication unit 50 may provide a wireless network connection, such as Wi-Fi (e.g. according to the IEEE 802.11-standard), 3G, 4G, LTE, and/or satellite network communication. The network connection may be an internet connection or may be a local network connection, such as a local area network (LAN) connection, or a VPN connection. The remote support device 1 and/or the network communication unit 50 may, hence, further include an antenna (not shown) adapted for use within a frequency band, e.g. 2.4 GHz and/or 5 GHz for Wi-Fi connections. The antenna may be integrated in an enclosure of the remote support device 1 or may be externally connected to the network communication unit through e.g. an antenna connection port, such as a coaxial port (not shown), connected to the network communication unit 50.

The control unit 10 controls the display 12, the user input device 14, the PMU 20, the video capturing unit 40, and the network communication unit 50 connected to it as well as emulates the pointing device signal and the keyboard signal on the first 32 and second output port 34, respectively. The control unit may be a central processing unit (CPU), a microcontroller unit (MCU), a Digital Signal Processor (DSP), a field-programmable gate array (FPGA), or any combination thereof.

Figure 2:
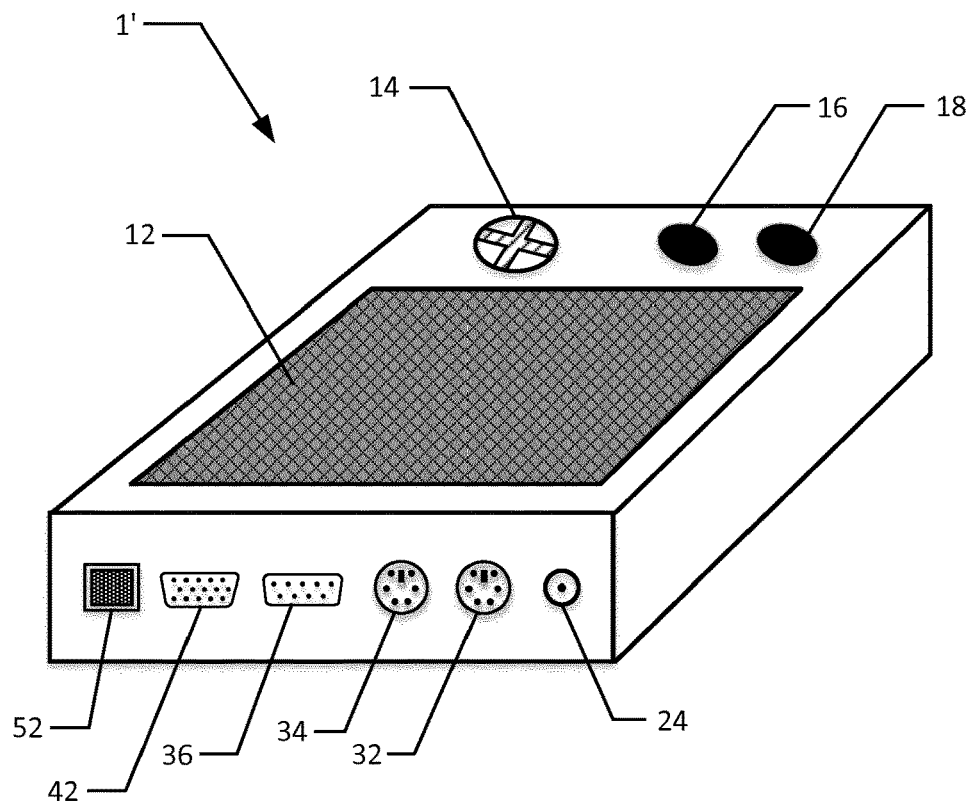
FIG. 2 shows a perspective exterior view of an embodiment of a portable remote support device according to the invention.

In FIG. 2, a perspective view of an embodiment of the portable remote support device 1' according to the invention is shown. The portable remote support device 1' is built up according to the block diagram in FIG. 1 and further comprises a network communication port 52 and a serial communication port 36. The first 16 and second buttons 18 are mechanical push buttons. In another embodiment, the buttons may be micro switches or capacitive touch buttons. The first button 16 acts as a power on/off button allowing the trusted person to turn the remote support device on and off. The second button 18 acts as an enter button allowing to confirm a choice from an on-screen menu. In other embodiments the functionality of the first 16 and the second button 18 may be reversed and/or the buttons 16, 18 may have other functions, e.g. allowing for reconnecting the device 1' to a network, or for rechecking if the cables have been correctly connected. The navigation button 14 may be used to navigate up, down, right, and/or left in an on-screen menu. In other embodiments, the remote support device may comprise fewer or more buttons, or the device may comprise a touchscreen instead of the display unit 12 and the buttons 14, 16, 18.

The display unit 12 comprises a liquid crystal display (LCD), connected to a control unit (not shown) of the remote support device 1' and shows, in use, status indicators showing network connection status, battery charge status, i.e. SoC, and port connection status for the individual input/output ports 24, 32, 34, 36, 42, 52 of the remote support device 1'. The display unit 12 may further be configured to show a unique secure token. The port connection status indicates, on which input/output ports 24, 32, 34, 36, 42, 52 a cable is inserted and communication is possible. Through the display unit 12, network connection settings, e.g. VPN-connection settings, DHCP-settings for IPv4- and IPv6-addresses for a LAN-connection, is shown and can be configured through the display unit 12 and the buttons 14, 16, 18. In another embodiment, the display unit 12 comprises a 3.5" light-emitting diode (LED) display and displays, in addition to the status indicators, the screen output of the computer equipment, when this is connected. The status indicators can be shown or hidden as overlays to the screen output of the computer equipment, or shown instead of the screen output. In another embodiment, the display unit 12 may comprise a thin-film-transistor (TFT) LCD, a light-emitting diode (LED) display, an organic LED (OLED) display, an active-matrix OLED display (AMOLED), or a quantum-dot LED (QLED) display, or any combination thereof. In another embodiment, the display unit 12 is a touchscreen and further includes a digitiser.

The power inlet 24 is a barrel-type connector for 5 VDC power input from an external power source (not shown) to charge the battery. In another embodiment, the power inlet 24 may be a Universal Serial Bus (USB) compliant plug, such as a USB-A plug, a micro-USB plug, or a USB-C plug, a Thunderbolt-plug, a FireWire plug, or a 0.093"-standard connector, or any combination thereof. In another embodiment, a bus or rail voltage of the first 32 or second output port 34 or the serial communication port 36 may provide the power input to the PMU, and the power inlet 24 may be omitted.

The first 32 and second output ports 34 of the remote support device 1' are a PS/2 mouse port and PS/2 keyboard port, respectively. Hence, only mouse and keyboard signals may be transmitted through the first 32 and second output port 34, respectively. Thereby the risk of malicious software being transmitted to the computer equipment is minimised. In another embodiment, the first 32 and second output ports 34 may be USB-ports, such as USB-A, USB-B, or USB-C, FireWire-ports, or serial communication ports, such as an RS-232, UART, or USART, or any combination thereof. USB-ports, however, are not preferred, as they may compromise security or security policies in vulnerable computer equipment environments, such as server environments. The serial port 36 is a 9-pin D-subminiature RS-232 port, which may be used to connect to network equipment such as routers, switches etc. The serial port 36 is connected to the control unit 10, which provides the communication with equipment connected through the serial port 36. In other embodiments, a plurality of serial ports may be connected to the control unit 10.

The video input port 42, which is connected to the video capturing device, is a 15-pin RS-232 port for connecting to a VGA-output of the computer equipment. In other embodiments, the video input port 42 may be a digital port, such as a Digital Visual Interface (DVI) port, a High-Definition Multimedia Interface (HDMI) port, or a DisplayPort, or any combination thereof.

Furthermore, the network communication port 52 is an 8P8C-connector for a RJ-45 compliant network connection. In another embodiment, this may be a 6P2C-connector for an RJ-11 compliant network connection. In other embodiments, the remote support unit 1' may comprise an antenna port for connecting to an external antenna, connected to the network communication unit, in combination with or instead of the network communication port 52. The antenna port may be a coaxial port, having e.g. a Sub-Miniature version A (SMA) connector, a Bayonet Neill-Concelman (BNC) connector, or a Type N connector.

Figure 3:
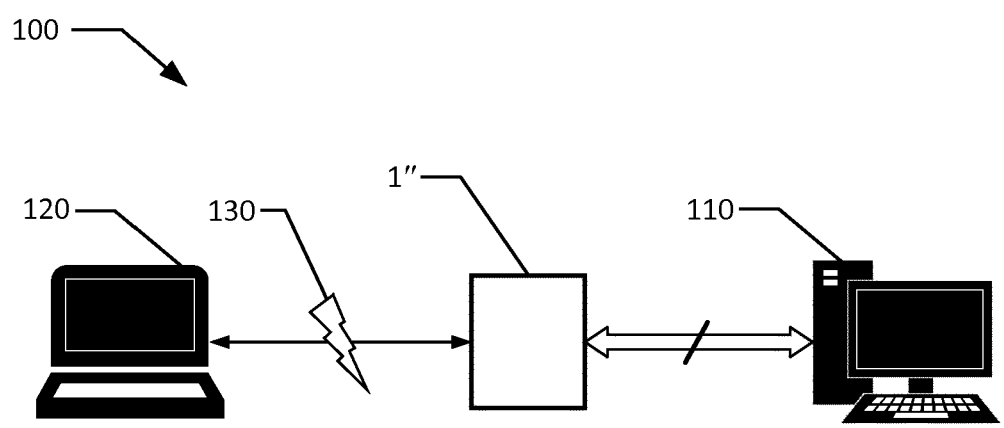
FIG. 3 shows a schematic drawing of a system comprising a portable remote support device according to the invention.

In FIG. 3 a schematic drawing of a system 100 comprising a portable remote support device 1" according to the invention is shown. The remote support device 1" is connected to the computer equipment 110 by at least the first and second output port and video input port of the remote support device 1". The remote support device 1" is further connected to the remote computer 120 of the technician via a secure network connection 130. The remote computer 120 may be a server, a PC, a tablet-PC, a smartphone, and/or a Personal Digital Assistant (PDA). Furthermore, the network connection 130 may be a LAN-connection, a peer-to-peer network connection, a VPN-connection, or a Personal Area Network (PAN) connection, or any combination thereof. The secure network connection 130 is established using a unique secure token, in the manner described above. Preferably, the technician may be identified and/or authorised to connect to the remote support device 1" by an IP-address of the remote computer 120 on the network provided by the network connection 130. The connection may be established through e.g. an application or a browser plug-in of the remote computer 120 or from a built-in feature in the operating system of the remote computer 120 or through a browser. The pointing device and keyboard signal may be emulated by the remote support device 1" based on e.g. the mouse, touchpad, trackpad, stylus and/or finger input and keyboard, keypad or on-screen key input to the remote computer 120, respectively, from the technician. In some embodiments, the control unit of the remote support device 1", or an application or browser plug-in of the remote computer 120, may process the signal to adjust for e.g. differences in screen resolution and scaling between the computer equipment 110 and the remote computer 120. Furthermore, the technician may send commands, e.g. through a command prompt or terminal, which the remote support device 1" may forward to the computer equipment 110 through a serial port, or convert into pointing device movements or keystrokes and transmit to the computer equipment 110. Similarly, communication via e.g. a serial communication between a serial communication port of the remote support device 1" and the computer equipment 110 may be transmitted to the remote computer 120.

Although some embodiments have been described and shown in detail, the invention is not restricted to them, but may also be embodied in other ways within the scope of the subject matter defined in the following claims. In particular, it is to be understood that other embodiments may be utilised and structural as well as functional modifications may be made without departing from the scope of the present invention. It should furthermore be emphasised that the term "comprises"/"comprising" when used in this specification is taken to specify the presence of stated features, integers, steps or components but not preclude the presence or addition of one or more features, integers, steps, components or groups thereof.

The invention claimed is:

1. A method for remote supporting computer equipment, the method comprising the steps of:
    providing a portable remote support device comprising:
        a processing unit;
        a network communication unit configured to communicate with a cloud service;
        a video capturing unit;
        at least one video input port and at least one output port;
        said processing unit being configured to communicate video signals received via the video input port to the cloud service via the network communication unit; and
        said processing unit being configured to emulate pointing device signals and/or keyboard signals received via the network communication unit on said at least one output port; and wherein the portable remote support device is configured to receive unique secure tokens from the cloud service via the network communication unit, and to establish a secure connection between the remote support device and a remote computer, via the cloud service and using the unique secure token,
    connecting the at least one output port of the portable remote support device to a pointing device input port and/or a keyboard input port of the computer equipment, connecting a video output port of the computer equipment to the video input port of the portable remote support device, connecting, by the network communication unit, the portable remote support device to a cloud service, the portable remote support device requesting a unique secure token from the cloud service, the cloud service generating a unique secure token in response to the request from the portable remote support device, sharing the unique secure token among the portable remote support device and the cloud service by the cloud service communicating the generated unique secure token to the portable remote support device, via the network communication unit, communicating the unique secure token to a remotely located technician, the remotely located technician accessing the cloud service by means of a remote computer, and entering the unique secure token, establishing a secure connection between the remote computer and the portable remote support device, via the cloud service, using the unique secure token, capturing by the video capturing unit of the portable remote support device a video output of the computer equipment and transmitting said captured video output to the remote computer via the established secure connection and thereby via the cloud service, and emulating on the at least one output port of the portable remote support device pointing device movements and/or keyboard keystrokes, in response to input to the remote computer, the input to the remote computer being transmitted to the portable remote support device via the established secure connection, and thereby via the cloud service.

2. The method according to claim 1, wherein the portable remote support device further comprises a display, and wherein the method further comprises the step of displaying the unique secure token on the display.

3. The method according to claim 1, wherein a unique secure token is generated for each support session performed using the portable remote support device.

* * * * *